(12) United States Patent
Abou-Emara et al.

(10) Patent No.: US 7,444,547 B2
(45) Date of Patent: Oct. 28, 2008

(54) METHOD, SYSTEM, AND PRODUCT FOR PROGRAMMING IN A SIMULTANEOUS MULTI-THREADED PROCESSOR ENVIRONMENT

(75) Inventors: Luai A. Abou-Emara, Austin, TX (US); Jen-Yeu Chen, Cedar Park, TX (US); Ronald Nick Kalla, Round Rock, TX (US)

(73) Assignee: International Business Machines Corproation, Armonk, NY (US)

( * ) Notice: Subject to any disclaimer, the term of this patent is extended or adjusted under 35 U.S.C. 154(b) by 1053 days.

(21) Appl. No.: 10/464,885

(22) Filed: Jun. 19, 2003

(65) Prior Publication Data

US 2004/0261078 A1 Dec. 23, 2004

(51) Int. Cl.
*G06F 11/00* (2006.01)
*G06F 11/28* (2006.01)

(52) U.S. Cl. .............................. 714/38; 714/35; 714/40; 717/124

(58) Field of Classification Search ................... 714/38, 714/35, 40; 717/124
See application file for complete search history.

(56) References Cited

U.S. PATENT DOCUMENTS

| | | | | |
|---|---|---|---|---|
| 5,226,131 A | * | 7/1993 | Grafe et al. ................. | 712/201 |
| 5,319,645 A | * | 6/1994 | Bassi et al. .................... | 714/38 |
| 5,511,192 A | * | 4/1996 | Shirakihara .................. | 718/106 |
| 5,590,326 A | * | 12/1996 | Manabe ....................... | 711/150 |
| 5,594,904 A | * | 1/1997 | Linnermark et al. ......... | 717/124 |
| 5,684,993 A | * | 11/1997 | Willman ...................... | 718/107 |
| 5,933,627 A | * | 8/1999 | Parady ......................... | 712/228 |
| 6,016,539 A | * | 1/2000 | Sollars ........................ | 712/200 |
| 6,209,066 B1 | * | 3/2001 | Holzle et al. ................. | 711/153 |
| 6,938,246 B2 | * | 8/2005 | Alford et al. ................. | 717/128 |
| 7,020,871 B2 | * | 3/2006 | Bernstein et al. ............ | 717/129 |
| 7,093,249 B2 | * | 8/2006 | Melamed et al. ............ | 718/100 |
| 7,120,762 B2 | * | 10/2006 | Rajwar et al. ................ | 711/150 |
| 2004/0078699 A1 | * | 4/2004 | Thompson et al. ............ | 714/42 |

* cited by examiner

*Primary Examiner*—Scott T. Baderman
*Assistant Examiner*—Joseph Schell
(74) *Attorney, Agent, or Firm*—Duke W. Yee; Diana R. Gerhardt; Lisa L. B. Yociss

(57) ABSTRACT

A system, method, and product are disclosed for testing multiple threads simultaneously. The threads share a real memory space. A first portion of the real memory space is designated as exclusive memory such that the first portion appears to be reserved for use by only one of the threads. The threads are simultaneously executed. The threads access the first portion during execution. Apparent exclusive use of the first portion of the real memory space is permitted by a first one of the threads. Simultaneously with permitting apparent exclusive use of the first portion by the first one of the threads, apparent exclusive use of the first portion of the real memory space is also permitted by a second one of the threads. The threads simultaneously appear to have exclusive use of the first portion and may simultaneously access the first portion.

8 Claims, 4 Drawing Sheets

FIG. 6

| | | |
|---|---|---|
| 602 — 0x00000 | SHARED | INTERRUPT HANDLERS |
| 604 — 0x01000 | SHARED | UNUSED |
| 606 — 0x02000 | SHARED | TEST CODE "KERNEL" |
| 608 — 0x03000 | SHARED | TEST CODE AND HANDLERS |
| 610 — 0x04000 | SHARED | RESERVED |
| 612 — T0: 0x05000 | T1: 0x45000 | TEST VARIABLES |
| 614 — T0: 0x06000 | T1: 0x46000 | REGISTER SAVE AND COMPARE |
| 616 — 0x07000 | SHARED | TEST OPCODE TABLE |
| 618 — 0x08000 | SHARED | SEGMENT TABLE ENTRIES |
| 620 — 0x0A000 | SHARED | PAGE TABLE DEALLOCATION STACK |
| 622 — T0: 0x10000 | T1: 0x50000 | DATA ACTUAL PAGES |
| 624 — T0: 0x14000 | T1: 0x54000 | DATA START PAGES |
| 626 — T0: 0x18000 | T1: 0x58000 | DATA EXPECTED PAGES |
| 628 — T0: 0x1C000 | T1: 0x5C000 | UNUSED |
| 630 — T0: 0x20000 | T1: 0x60000 | INSTRUCTION PAGES |
| 632 — T0: 0x24000 | T1: 0x64000 | UNUSED |
| 634 — T0: 0x27000 | T1: 0x67000 | PTE TRACE FOR DEBUG |
| 636 — T0: 0x28000 | T1: 0x68000 | IAR INSTRUCTION TRACE |
| 638 — T0: 0x30000 / T0: 0x40000 | T1: 0x70000 / T1: 0x80000 | INTERRUPT TRACE |
| 640 | | |
| 642 — 0x80000 / 0xC0000 | SHARED / SHARED | PAGE TABLE |

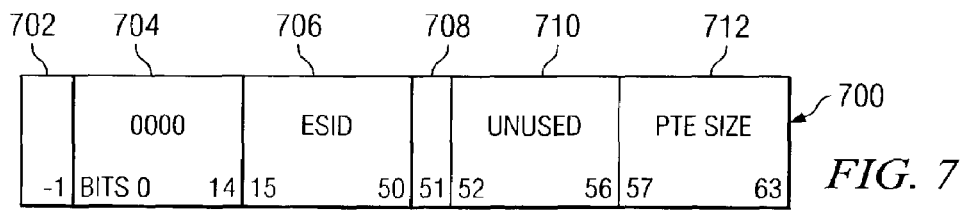

FIG. 7

METHOD, SYSTEM, AND PRODUCT FOR PROGRAMMING IN A SIMULTANEOUS MULTI-THREADED PROCESSOR ENVIRONMENT

BACKGROUND OF THE INVENTION

1. Technical Field

The present invention relates generally to the field of data processing systems, and more specifically to a method, system, and product for writing programs in a simultaneous multi-threaded processing environment. Still more particularly, the present invention relates to a method, system, and product in a simultaneous multi-threaded processing environment for testing a plurality of threads simultaneously where the threads have apparently exclusive use of a shared memory space.

2. Description of Related Art

A known method exists for testing a thread in a processor that is capable of executing one thread at a time. This method provides for testing the thread by "exercising" it. First, the thread is executed with most of the processor's features disabled. The results of the test are stored as "expected results". The features of the processor that are turned off are typically the processor's advanced features, such as speculative execution and out-of-order execution. The thread is then executed with these features enabled, and the results of the execution are stored as "actual results". The expected results and actual results are then compared. If they match, it is determined that the thread passed the test. If the expected and actual results do not match, it is determined that the thread did not pass the test.

Some processors are capable of processing multiple threads simultaneously. These processors are referred to as Simultaneous Multi-Threaded (SMT) processors. In order to test threads simultaneously in these processors, the process described above must be executed for each thread. However, executing the process described above for each thread simultaneously would require duplicating the test program for each thread and would require large amounts of memory space in order to store the multiple copies of the test program.

Therefore, a need exists for a method, system, and product for testing a plurality of threads simultaneously without requiring the duplication of the test program for each thread and thus reducing the amount of memory storage needed to store the test program.

SUMMARY OF THE INVENTION

A system, method, and product are disclosed for testing multiple threads simultaneously. The threads share a real memory space. A first portion of the real memory space is designated as exclusive memory such that the first portion appears to be reserved for use by only one of the threads. The threads are simultaneously executed. The threads access the first portion during execution. Apparent exclusive use of the first portion of the real memory space is permitted by a first one of the threads. Simultaneously with permitting apparent exclusive use of the first portion by the first one of the threads, apparent exclusive use of the first portion of the real memory space is also permitted by a second one of the threads. The threads simultaneously appear to have exclusive use of the first portion and may simultaneously access the first portion.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates a block diagram of the allocation of real memory locations of a memory device in accordance with the present invention; and FIG. 7 depicts the allocation of bits of a virtual address that are used by the present invention to address memory locations in accordance with the present invention.

DETAILED DESCRIPTION OF THE PREFERRED EMBODIMENT

A preferred embodiment of the present invention and its advantages are better understood by referring to the figures, like numerals being used for like and corresponding parts of the accompanying figures.

The present invention is a method, system, and product for testing a plurality of threads simultaneously without corrupting data in an SMT processor where the threads are forced to share a constrained real memory space.

Portions of the real memory space may be shared by multiple threads. Portions of this shared real space may be accessed and used by any thread without concern that a thread might corrupt the data stored in the real space. For example, the test code "kernel" may be stored in this type of shared real space and accessed by any thread.

Other portions of the shared real space may be accessed by any thread, but once a memory location is accessed by a thread that location may be subsequently accessed by only that same thread. For example, a page table or segmentation table may be stored within the real memory space. A thread may access and utilize any location within the table that has not already been accessed by a different thread. Once a thread stores data in the table, only that same thread may later access that data.

Other portions of the real memory space may appear to a thread to be used exclusively by that particular thread although other threads may also access those portions. For example, common variables may be used by multiple threads. These variables may be stored in non-shared portions of the real memory space. These variables are addressed by different threads using different virtual addresses. The same real memory space is accessed using different virtual addresses by different threads. In this manner, the real memory space appears to a thread to be reserved for that thread's exclusive use even though other threads may access the same real memory.

Figure 1:
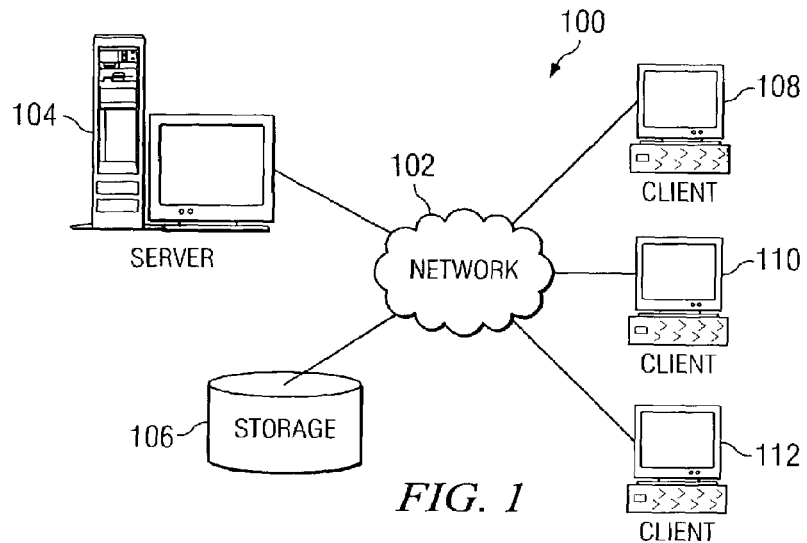
FIG. 1 is a pictorial representation which depicts a network of data processing systems in accordance with the present invention.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, a server 104 is connected to network 102 along with storage unit 106. In addition, clients 108, 110, and 112 also are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the TCP/IP suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
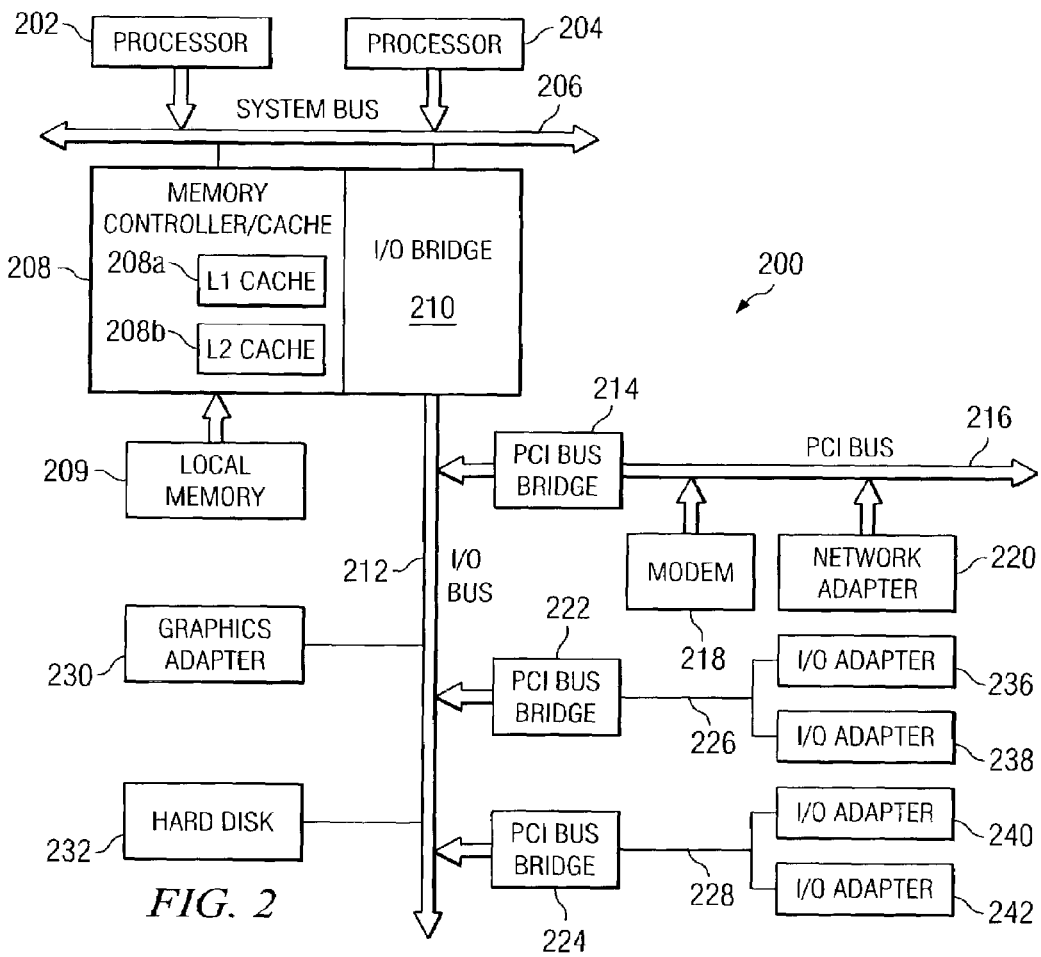
FIG. 2 is a more detailed illustration of a computer system that may be used to implement any of the computer systems of FIG. 1 in accordance with the present invention.

FIG. 2 is a more detailed illustration of a computer system that may be used to implement any of the computer systems of FIG. 1 in accordance with the present invention. Data processing system 200 is a symmetric multiprocessor (SMP) system including a plurality of processors 202 and 204 connected to system bus 206. Alternatively, a single processor system may be employed. Also connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Memory controller/cache 208 includes an L1 cache 208a and an L2 cache 208b. Each cache is a limited size. The present invention's test program along with variables, page tables, result storage and all other test program software components are stored within L2 cache 208b. Although the preferred embodiment describes using L2 cache 208b as the memory device, those skilled in the art will recognize that the present invention may be implemented in any memory device, such as L1 cache 208a, local memory 209, hard disk 232, or any other memory that is not depicted.

Peripheral component interconnect (PCI) bus bridge 214 connected to I/O bus 212 provides an interface to PCI local bus 216. A number of modems may be connected to PCI bus 216. Typical PCI bus implementations will support four PCI expansion slots or add-in connectors. Communications links to network computers 108-112 in FIG. 1 may be provided through modem 218 and network adapter 220 connected to PCI local bus 216 through add-in boards.

Additional PCI bus bridges 222 and 224 provide interfaces for additional PCI buses 226 and 228. One or more adapters may be coupled to buses 226 and 228. For example, I/O adapter 236 and I/O adapter 238 are both coupled to bus 226 in order to communicate with I/O bus 212. Similarly, I/O adapter 240 and I/O adapter 242 are both also coupled to bus 226 in order to communicate with I/O bus 212.

Data processing system 200 allows connections to multiple network computers. A memory-mapped graphics adapter 230 and hard disk 232 may also be connected to I/O bus 212 as depicted, either directly or indirectly.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention. The data processing system depicted in FIG. 2 may be, for example, an IBM RISC/System 6000 system, a product of International Business Machines Corporation in Armonk, N.Y., running the Advanced Interactive Executive (AIX) operating system.

Figure 3:
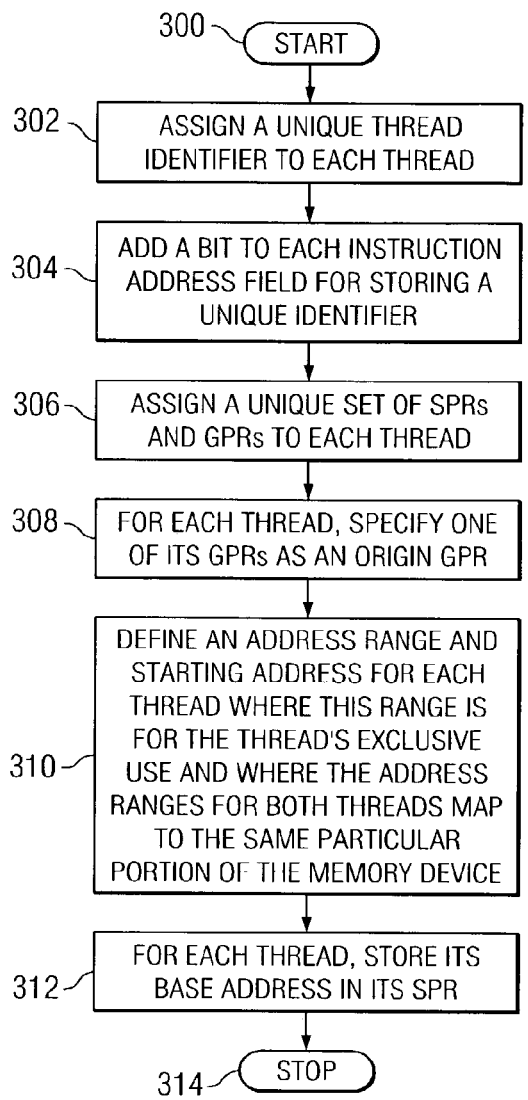
FIG. 3 depicts a high level flow chart which illustrates the assignment of registers to threads and the addition of a thread identification bit in each virtual address in accordance with the present invention.

FIG. 3 depicts a high level flow chart which illustrates the assignment of registers to threads and the addition of a thread identification bit in each virtual address in accordance with the present invention. The process starts as depicted by block 300 and thereafter passes to block 302 which illustrates the assignment of a unique thread identifier to each thread. In the example described herein, one thread is assigned the unique identifier of "0" while the other thread is assigned the unique identifier of "1".

Next, block 304 depicts adding a bit to each instruction's virtual address field for storing a unique thread identifier. Thereafter, block 306 illustrates the assignment of a unique set of special purpose registers (SPRs) and general purpose registers (GPRs) to each thread. Thus, each thread will have assigned for its own exclusive use a set of SPRs and a set of GPRs.

The process then passes to block 308 which depicts for each thread, specifying one of the GPRs assigned to the thread as that thread's origin GPR. A base address will be stored in the thread's origin GPR. Thus, in order to calculate an address that a thread is attempting to access, the thread's base address may be obtained from the thread's origin GPR. This base address may then be added to an offset or used when disassembling a label in order to calculate the virtual address to be used.

Next, block 310 illustrates defining a virtual address range and a virtual starting address for each thread. This address range appears to the thread as that thread's exclusive memory space. This range of virtual addresses maps to a particular range of real memory locations within a storage device. In accordance with the present invention, another thread has defined for its use a range of virtual addresses. These virtual addresses map to the same particular range of real memory locations. Thus, an address appears to a thread to be available exclusively for the thread's use even though the real memory location to which this address maps is shared by at least one other thread. The process then passes to block 312 which depicts for each thread, storing a base address for the thread in one of the thread's SPRs. The process then terminates as illustrated by block 314.

Figure 4:
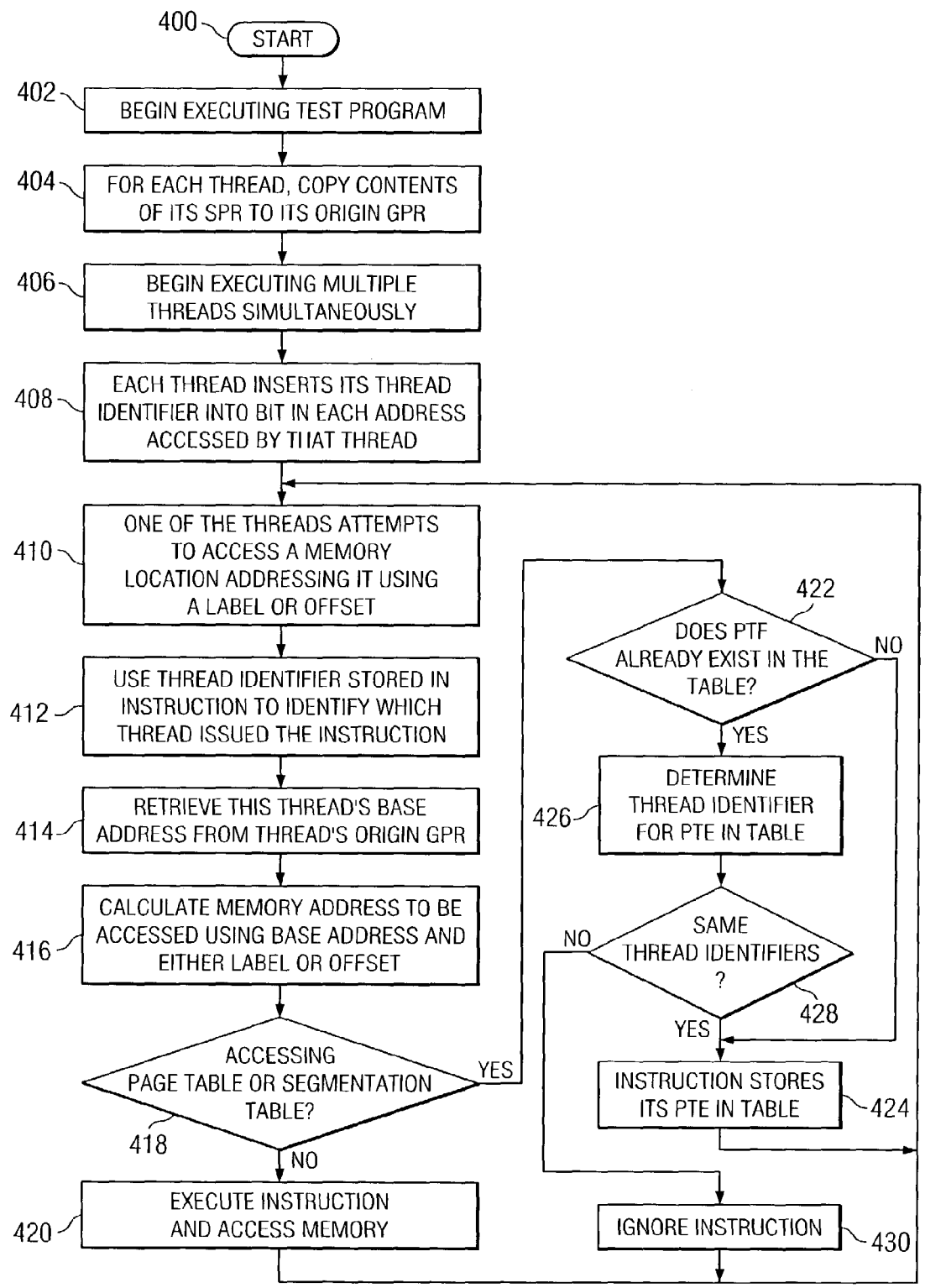
FIG. 4 illustrates a high level flow chart which depicts executing a program to test a plurality of threads simultaneously where the threads have apparently exclusive use of a shared memory space in accordance with the present invention.

FIG. 4 illustrates a high level flow chart which depicts executing a program to test a plurality of threads simultaneously where the threads have apparently exclusive use of a shared memory space in accordance with the present invention. The process starts as depicted by block 400 and thereafter passes to block 402 which illustrates beginning the executing of the test program. Next, block 404 depicts, for each thread, copying the contents of a thread's SPR to its origin GPR. In this manner, the base virtual address that is stored in the thread's SPR is copied into the thread's origin GPR. The contents of the general purpose registers may be altered or corrupted during processing. The contents of the special purpose registers do not change during processing. Therefore, it is necessary to keep a thread's base address in one of its SPRs. This address may then be copied to a thread's origin GPR for use during execution of a program such as the test program.

Thereafter, block 406 illustrates beginning the executing of the multiple threads simultaneously. The process then passes to block 408 which depicts each thread inserting its own unique thread identifier into the bit reserved for thread identifiers in the virtual address included in each instruction executed by that thread. Thus, for example, each time the first thread executes an instruction, that thread inserts a "0" into its instruction. Each time the second thread executes an instruction, that thread inserts a "1" into its instruction. Block 410, then, illustrates one of the threads attempting to access a memory location by addressing it using a label or offset. This memory location may be included within a page table or it may be where variables are stored, for example.

Next, block 412 depicts using the thread identifier stored in the address portion of the instruction to identify which thread issued the instruction. Thereafter, block 414 illustrates retrieving this thread's, i.e. the thread that issued this instruction, base address from the thread's origin GPR. The process then passes to block 416 which depicts calculating the real memory address to be accessed using the base address retrieved from the origin GPR and either the label or offset.

Block 418, then, illustrates a determination of whether or not this instruction is attempting to access a shared memory location such as a page table or segmentation table. If a determination is made that this instruction is not attempting to access a shared memory location such as either a page table or segmentation table, the process passes to block 420 which depicts executing the instruction and accessing the memory location. The process then passes back to block 410.

Referring again to block 418, if a determination is made that this instruction is attempting to access a shared memory location such as either a page table or segmentation table, the process passes to block 422 which illustrates a determination of whether or not a page table entry (PTE) already exists within the table at the address specified by the instruction. If a determination is made that a page table entry does not already exist at the specified address, the process passes to block 424 which depicts the instruction storing within the table the PTE that is included as part of the instruction. The process then passes back to block 410.

Referring again to block 422, if a determination is made that a PTE does already exist within the table at the specified address, the process passes to block 426 which depicts determining the thread identifier that is stored in the existing PTE. Next, block 428 illustrates a determination of whether or not the thread identifier included within this instruction is the same as the thread identifier that is stored within the existing PTE at the specified address. If these thread identifiers are the same, the process passes to block 424. If a determination is made that these thread identifiers are different, the process passes to block 430 which depicts ignoring the instruction. Thus, an instruction is not allowed to alter the page table when the instruction was issued by one thread and when the instruction is attempting to change the data that had already been stored in a memory location by a different thread. The process then passes back to block 410.

Figure 5:
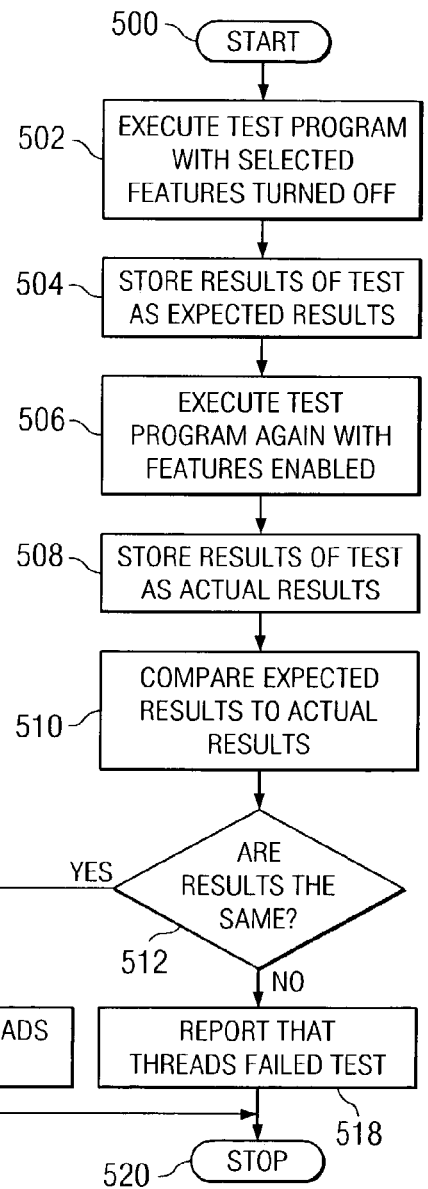
FIG. 5 depicts a high level flow chart which illustrates testing a plurality of threads by executing a test program multiple times and comparing the results obtained after each execution of the test program in accordance with the present invention.

FIG. 5 depicts a high level flow chart which illustrates testing a plurality of threads by executing a test program multiple times and comparing the results obtained after each execution of the test program in accordance with the present invention. The process starts as depicted by block 500 and thereafter passes to block 502 which illustrates executing a test program with selected features of the processor disabled, or turned off. Next, block 504 depicts storing the results of the test in the memory device as "expected results".

The process then passes to block 506 which depicts executing the test program again, this time with the selected features turned back on. Thereafter, block 508 illustrates storing the results of this test in the memory device as "actual results". Next, block 510 depicts a comparison of the expected results to the actual results. Block 512, then, illustrates a determination of whether or not the results are the same. If a determination is made that the results are the same, the process passes to block 514 which depicts reporting that the threads passed the test. The process then terminates as illustrated by block 520. Referring again to block 512, if a determination is made that the results are different, the process passes to block 518 which depicts reporting that the threads failed the test.

FIG. 6 illustrates a block diagram of the allocation of real memory locations 600 of a memory device, such as an L2 cache, in accordance with the present invention. As depicted, some areas of the memory device are shared, such as for example, address ranges 0x00000 through 0x04000 602-610, 0x07000 through 0x0A000 616-620, and 0x80000 through 0xC0000 624.

Other areas of the memory appear to each thread to be areas that are exclusive to those threads, but that are actually shared by the threads, such as address ranges 05000 through 06000 612-614, and address ranges 0x10000 through 0x40000 622-638. For example, test variables are used by both threads and are stored only once in the memory device. However, to each thread the variables appear to be owned exclusively by that thread. Thus, thread 0 addresses the test variables using real address 0x05000, while thread 1 addresses the test variables using real address 0x45000. However, only one copy of these variables is stored in the cache even though it appears to each thread as if that thread had its own copy of the variables.

As another example, data actual pages are used by both threads and are stored only once in the memory device. Because to each thread the variables appear to be owned exclusively by that thread, thread 0 addresses the data actual pages using real address 0x10000, while thread 1 addresses the data actual pages using real address 0x50000.

Some areas of memory 600 are shared by multiple threads but include portions where one thread has stored data that should not be accessed by another thread. For example, a page table is stored from real address 0x80000 to 0xC0000. Within this page table, each thread may store data. When one thread has stored information, other threads should be prevented from altering that data.

FIG. 7 depicts the allocation of bits of a virtual address 700 that is used by the present invention to address memory locations in accordance with the present invention. The virtual address has been modified to add a bit that is used to store a thread identifier. An additional bit has been added, as depicted by field 702. Bits 0-50 are stored, as in the prior art, in fields 704 and 706. According to the present invention, a thread identifier is stored in field 708. Field 710, which includes bits 52-56, is unused. Field 712, which includes bits 57-63, is used to store the page table entry size. The prior art virtual address has been modified to add a bit which indicates which thread is attempting to access the particular virtual address. Therefore, according to the present invention, when a thread attempts to access a particular virtual address, the thread stores its thread identifier in the virtual address itself in field 708.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media such a floppy disc, a hard disk drive, a RAM, and CD-ROMs and transmission-type media such as digital and analog communications links.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method in a data processing system including a simultaneous multi-threaded processor for executing a plurality of threads simultaneously, said method comprising the steps of:
   simultaneously executing said plurality of threads, wherein said plurality of threads access a first portion of a real memory space included within said system during execution;
   permitting apparently exclusive use of said first portion by a first one of said plurality of threads and simultaneously permitting apparently exclusive use of said first portion by a second one of said plurality of threads, wherein said first and second ones of said plurality of threads simultaneously appear to have exclusive use of said first portion and may simultaneously access said first portion;
   executing a test program;
   testing said plurality of threads simultaneously in response to executing said test program;
   disabling particular features of said simultaneous multi-threaded processor;
   executing said test program a first time while said particular features are disabled, said test program generating first results in response to said executing said first time;
   re-enabling said particular features;
   executing said test program a second time while said particular features are enabled, said test program generating second results in response to said executing said second time; and
   comparing said first and second results to determine whether said plurality of threads passed said test.

2. The method according to claim 1, further comprising the steps of:
   associating a first base address with a first one of said plurality of threads;
   associating a second base address with a second one of said plurality of threads;
   addressing said first portion of said real memory space by said first one of said plurality of threads utilizing said first base address; and
   addressing said first portion of said real memory space by said second one of said plurality of threads utilizing said second base address.

3. The method according to claim 2, further comprising the steps of:
   assigning a first unique set of special purpose registers to said first one of said plurality of threads;
   storing said first base address in one of said first unique set of special purpose registers;
   assigning a second unique set of special purpose registers to said second one of said plurality of threads; and
   storing said second base address in one of said second unique set of special purpose registers.

4. The method according to claim 3, further comprising the steps of:
   starting execution of a test program;
   copying said first base address from one of said first unique set of special purpose registers to one of a first unique set of general purpose registers;
   copying said second base address from one of said second unique set of special purpose registers to one of a second unique set of general purpose registers;
   generating an address for said first one of said plurality of threads by adding an offset to said base address stored in said one of said first unique set of general purpose registers; and
   generating an address for said second one of said plurality of threads by adding an offset to said base address stored in said one of said second unique set of general purpose registers.

5. The method according to claim 1, further comprising the steps of:
   inserting a bit into each address field for each instruction that is to be executed by said processor; and
   storing a unique thread identifier in said bit for each instruction, said unique thread identifier identifying a thread that executed said each instruction.

6. The method according to claim 5, further comprising the steps of:
   executing an instruction including a unique thread identifier and data, said instruction addressing a location in a shared portion of said real memory space;
   determining whether an entry has already been stored in said location; and
   in response to a determination that no entry has already been stored in said location, storing said unique thread identifier and said data in said location.

7. The method according to claim 6, further comprising the steps of:
   in response to a determination that an entry has already been stored in said location, finding a unique thread identifier already stored in said location;
   determining whether said unique thread identifier already stored in said location matches said unique thread identifier included in said instruction;
   in response to a determination that said unique thread identifier already stored in said location matches said unique thread identifier included in said instruction, storing said unique thread identifier and said data in said location; and
   in response to a determination that said unique thread identifier already stored in said location does not match said unique thread identifier included in said instruction, discarding said instruction, wherein said unique thread identifier and said data included in said instruction are not stored in said location.

8. A method in a data processing system including a simultaneous multi-threaded processor for executing a plurality of threads simultaneously, said method comprising the steps of:

simultaneously executing said plurality of threads, wherein said plurality of threads access a first portion of a real memory space included within said system during execution;

permitting apparently exclusive use of said first portion by a first one of said plurality of threads and simultaneously permitting apparently exclusive use of said first portion by a second one of said plurality of threads, wherein said first and second ones of said plurality of threads simultaneously appear to have exclusive use of said first portion and may simultaneously access said first portion;

executing a test program;

testing said plurality of threads simultaneously in response to executing said test program;

inserting a bit into each address field for each instruction that is to be executed by said processor;

storing a unique thread identifier in said bit for each instruction, said unique thread identifier identifying a thread that executed said each instruction;

executing an instruction including a unique thread identifier and data, said instruction addressing a location in a shared portion of said real memory space;

determining whether an entry has already been stored in said location;

in response to a determination that no entry has already been stored in said location, storing said unique thread identifier and said data in said location;

in response to a determination that an entry has already been stored in said location, finding a unique thread identifier already stored in said location;

determining whether said unique thread identifier already stored in said location matches said unique thread identifier included in said instruction;

in response to a determination that said unique thread identifier already stored in said location matches said unique thread identifier included in said instruction, storing said unique thread identifier and said data in said location; and in response to a determination that said unique thread identifier already stored in said location does not match said unique thread identifier included in said instruction, discarding said instruction, wherein said unique thread identifier and said data included in said instruction are not stored in said location.

* * * * *